United States Patent
Andrieux et al.

(10) Patent No.: US 11,264,846 B2
(45) Date of Patent: Mar. 1, 2022

(54) SPLIT STATOR BODY FOR AN ELECTRIC MACHINE

(71) Applicant: MOVING MAGNET TECHNOLOGIES, Besançon (FR)

(72) Inventors: Gael Andrieux, Evilard (CH); Gilles Tonnelier, Ecole Valentin (FR); Pierre Marchal, Besancon (FR)

(73) Assignee: Moving Magnet Technologies, Besancon (FR)

( * ) Notice: Subject to any disclaimer, the term of this patent is extended or adjusted under 35 U.S.C. 154(b) by 200 days.

(21) Appl. No.: 16/498,661

(22) PCT Filed: Mar. 29, 2018

(86) PCT No.: PCT/FR2018/050766
§ 371 (c)(1),
(2) Date: Sep. 27, 2019

(87) PCT Pub. No.: WO2018/178576
PCT Pub. Date: Oct. 4, 2018

(65) Prior Publication Data
US 2021/0111594 A1 Apr. 15, 2021

(30) Foreign Application Priority Data

Mar. 31, 2017 (FR) ...................................... 1752821
Aug. 24, 2017 (FR) ...................................... 1757839

(51) Int. Cl.
H02K 1/14 (2006.01)
(52) U.S. Cl.
CPC ......... H02K 1/148 (2013.01); *H02K 2201/18* (2013.01)

(58) Field of Classification Search
CPC combination set(s) only.
See application file for complete search history.

(56) References Cited

U.S. PATENT DOCUMENTS

| 5,521,451 | A | 5/1996 | Oudet et al. |
| 6,628,032 | B1 | 9/2003 | Oudet et al. |
| 8,102,093 | B2 | 1/2012 | Prudham |

(Continued)

FOREIGN PATENT DOCUMENTS

| DE | 202016104603 U1 | 12/2016 |
| WO | WO-2004/021548 A1 | 3/2004 |
| WO | WO-2014/136145 A1 | 9/2014 |

OTHER PUBLICATIONS

Finley, W. R., et al., "An Analytical Approach to Solving Motor Vibration Problems," IEEE, Paper No. PCIC-99-20, 1999, 16 pages.

*Primary Examiner* — Naishadh N Desai
(74) *Attorney, Agent, or Firm* — Harness, Dickey & Pierce PLC

(57) ABSTRACT

A stator for an electric machine having a plurality of radially extending teeth, supported by an outer annular yoke radial to the teeth, at least part of the teeth supporting a coil and the outer annular yoke having flutes of partially cylindrical shape opening towards the teeth, at least part of the teeth each having, at their end, on the side of the outer annular yoke, a protuberance of partially cylindrical shape, the protuberance being held in the flute by contact points so that at least one part of the teeth performs a relative movement having a degree of rotational and/or translational freedom relative to the annular yoke.

20 Claims, 19 Drawing Sheets

(56) References Cited

U.S. PATENT DOCUMENTS

| | | |
|---|---|---|
| 8,398,384 B2 | 3/2013 | Peterreins et al. |
| 8,860,282 B2 | 10/2014 | Gandel et al. |
| 8,890,514 B2 | 11/2014 | Masson et al. |
| 9,614,426 B2 | 4/2017 | Heinrich |
| 9,935,536 B2 | 4/2018 | Rios-Quesada et al. |
| 10,050,487 B2 | 8/2018 | Biwersi et al. |
| 10,164,486 B2 | 12/2018 | Hyppias et al. |
| 10,389,197 B2 | 8/2019 | Biwersi et al. |
| 2001/0030486 A1* | 10/2001 | Pijanowski ............ H02K 3/522 310/254.1 |
| 2009/0174280 A1 | 7/2009 | Prudham |
| 2009/0189477 A1* | 7/2009 | Yamamoto ............ H02K 1/148 310/216.058 |
| 2009/0195112 A1* | 8/2009 | Chai ...................... H02K 1/148 310/216.086 |
| 2012/0146627 A1 | 6/2012 | Masson et al. |
| 2013/0057105 A1 | 3/2013 | Patterson et al. |
| 2014/0283732 A1 | 9/2014 | Heinrich |
| 2015/0048694 A1 | 2/2015 | Rios-Quesada et al. |
| 2015/0061453 A1* | 3/2015 | Taniguchi ............. H02K 1/165 310/216.074 |
| 2015/0263572 A1 | 9/2015 | Hyppias et al. |
| 2016/0233734 A1 | 8/2016 | Biwersi et al. |
| 2016/0315508 A1* | 10/2016 | Li ......................... H02K 1/148 |
| 2016/0352168 A1 | 12/2016 | Biwersi et al. |
| 2017/0141670 A1 | 5/2017 | Hyppias et al. |
| 2017/0163104 A1* | 6/2017 | Li ........................... H02K 3/18 |
| 2017/0324284 A1 | 11/2017 | Andrieux et al. |
| 2017/0338726 A1 | 11/2017 | Gandel et al. |
| 2018/0219435 A1 | 8/2018 | Billet et al. |
| 2019/0252944 A1 | 8/2019 | Watrin et al. |
| 2019/0280545 A1 | 9/2019 | Tonnelier et al. |

\* cited by examiner

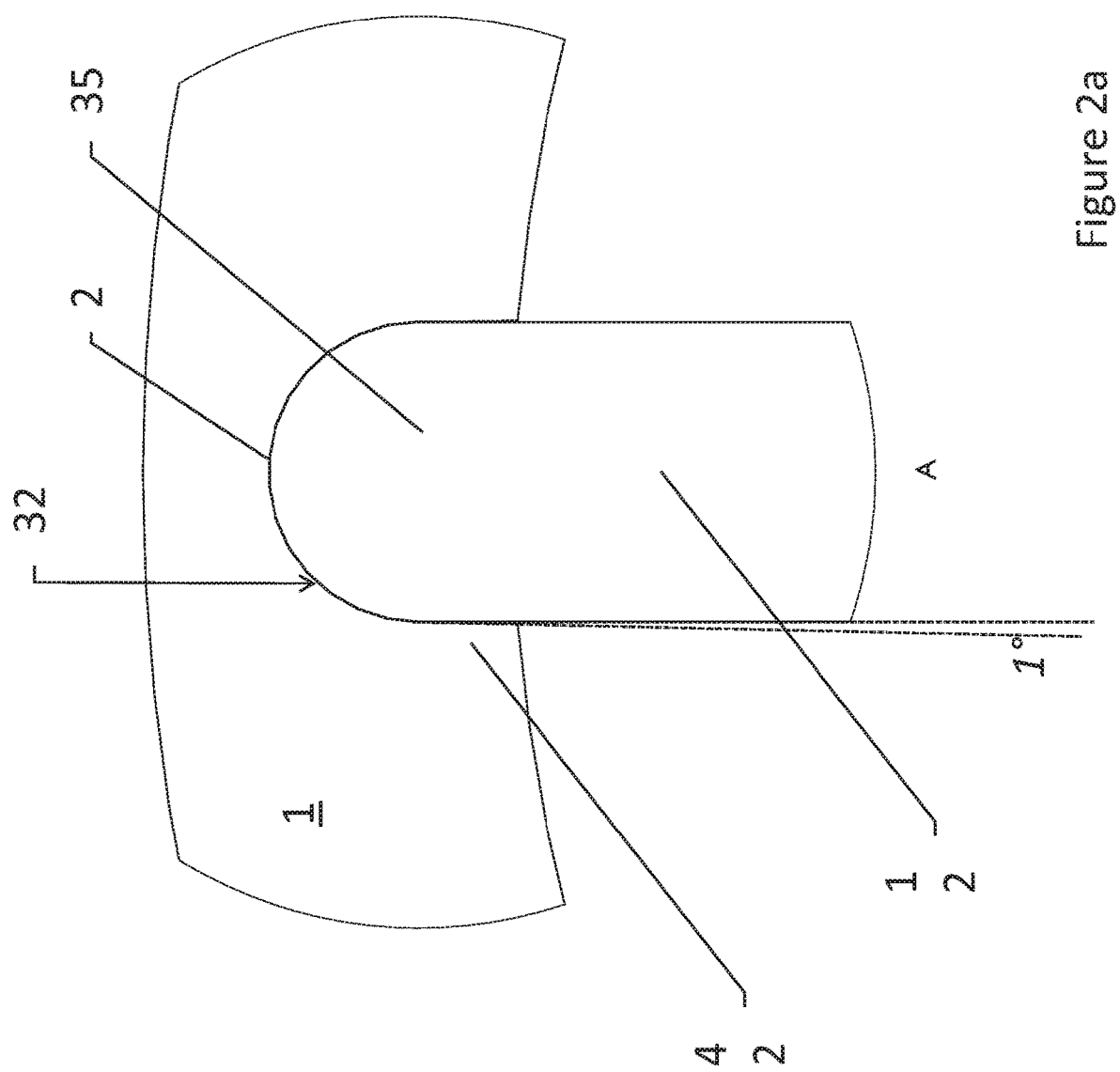
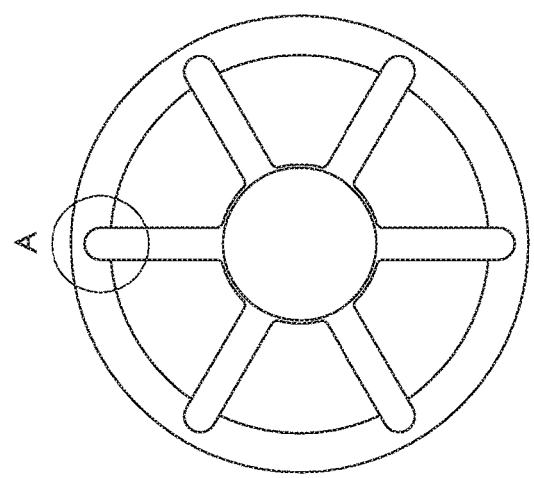
Figure 2a

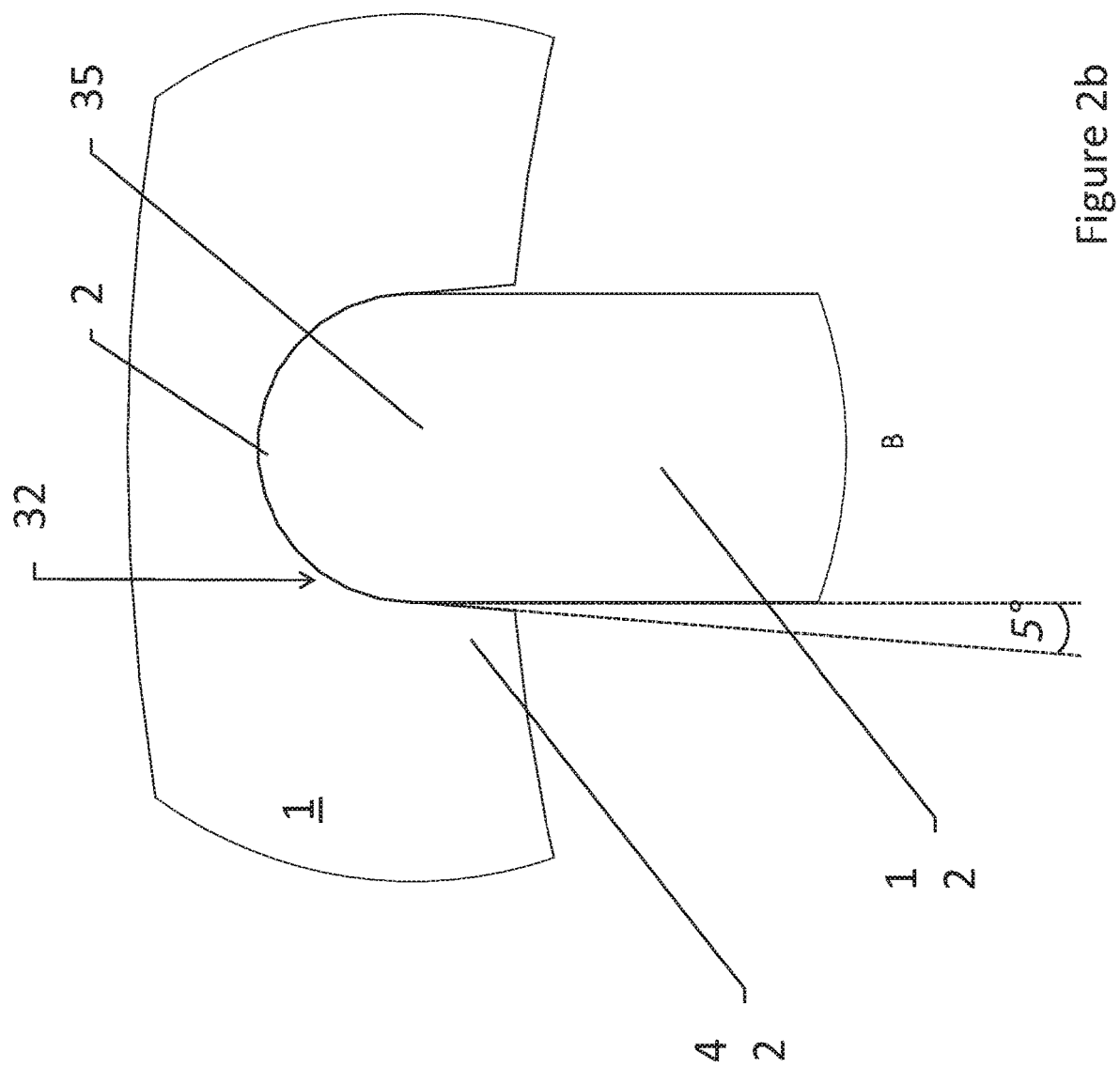
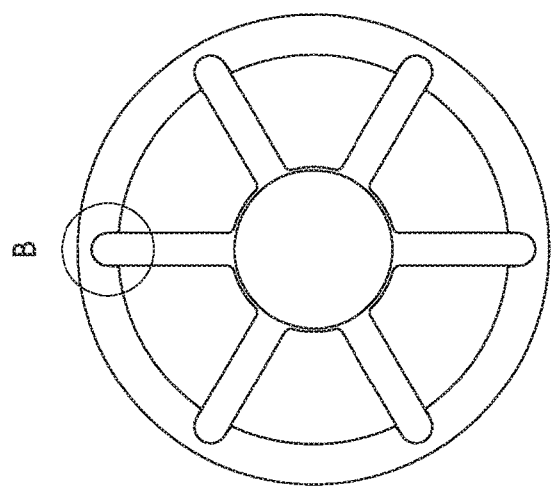
Figure 2b

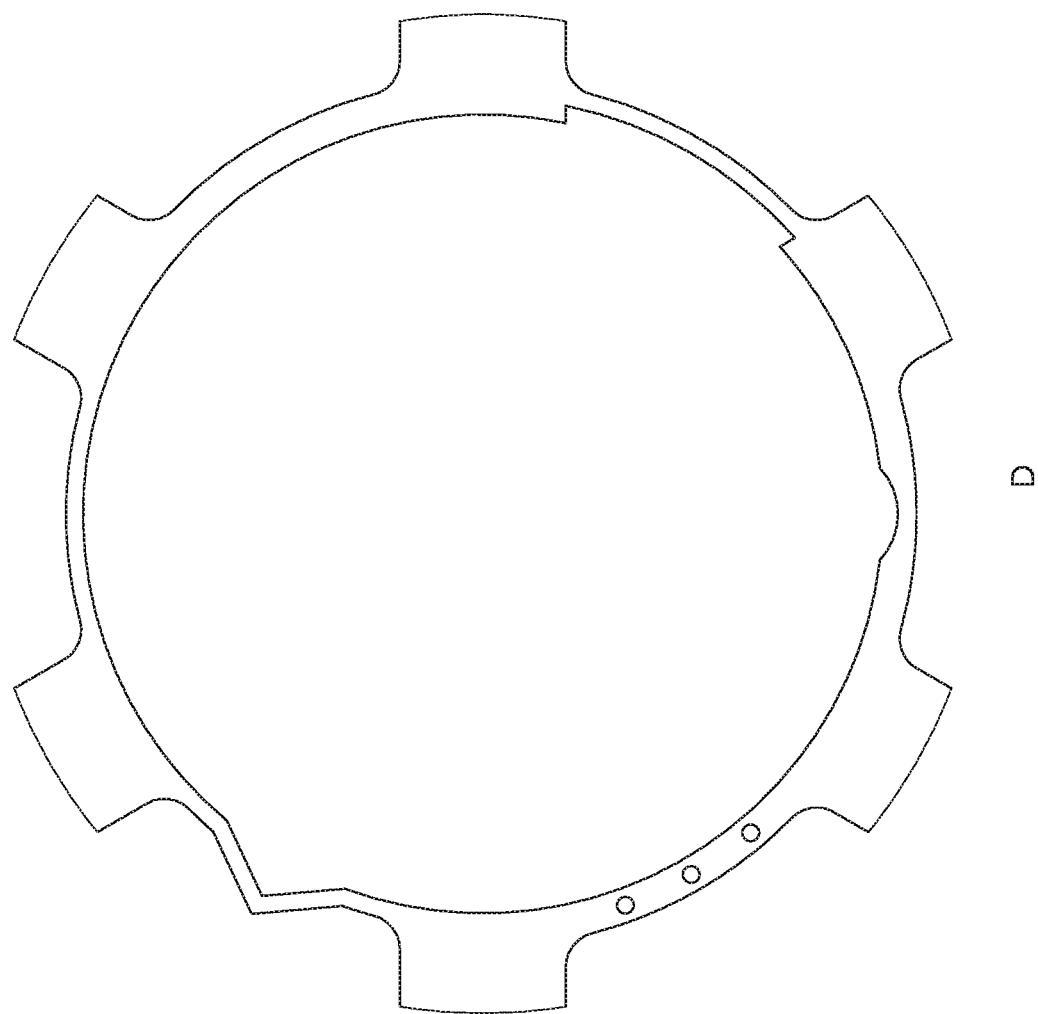
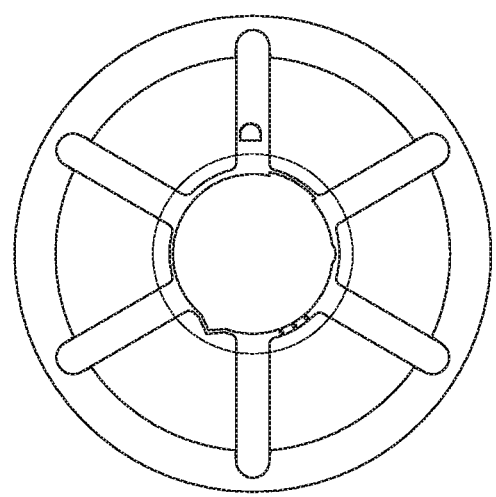
Figure 4

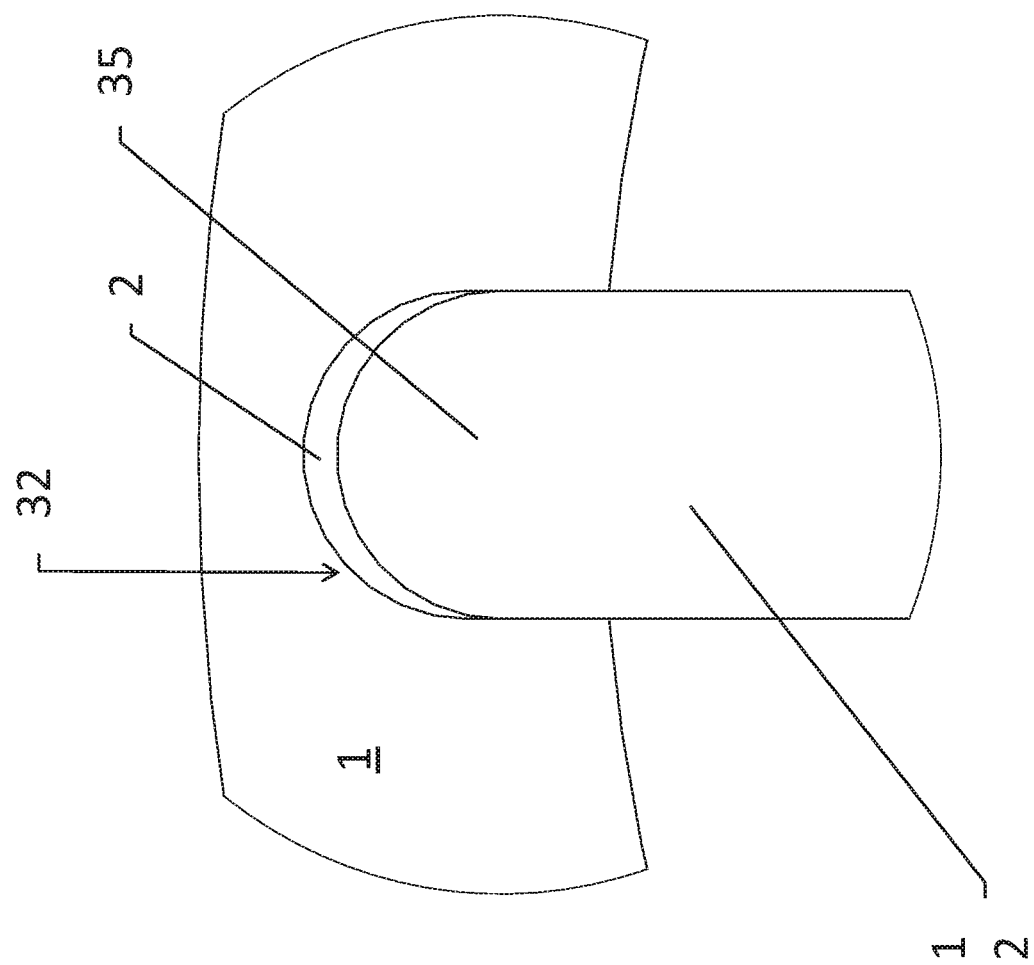
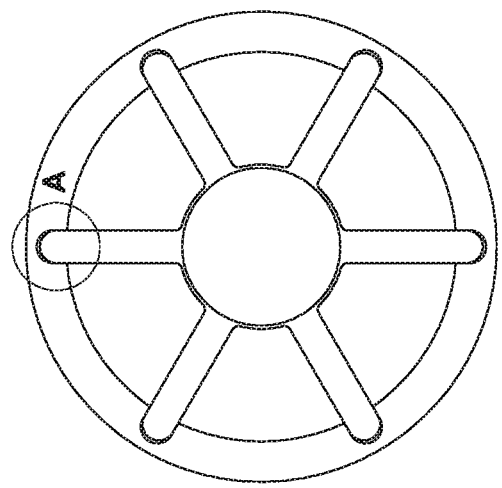
Figure 8

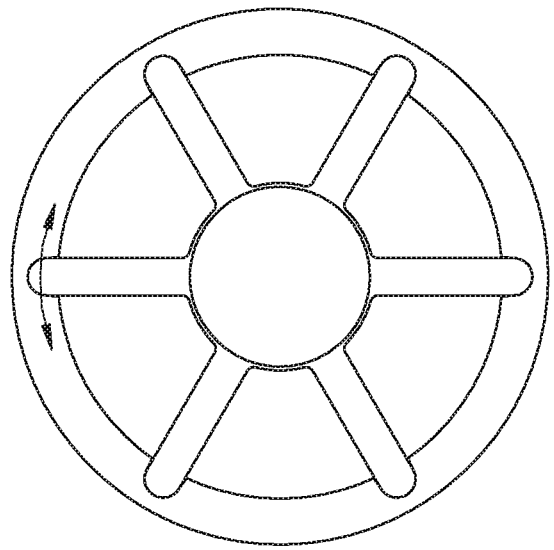
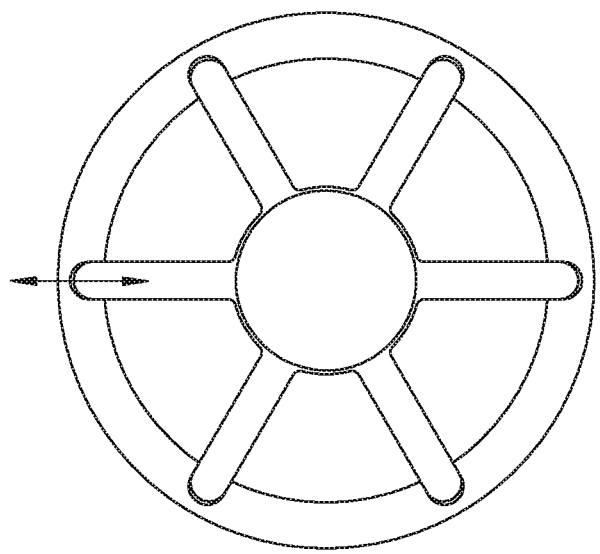
Figure 9

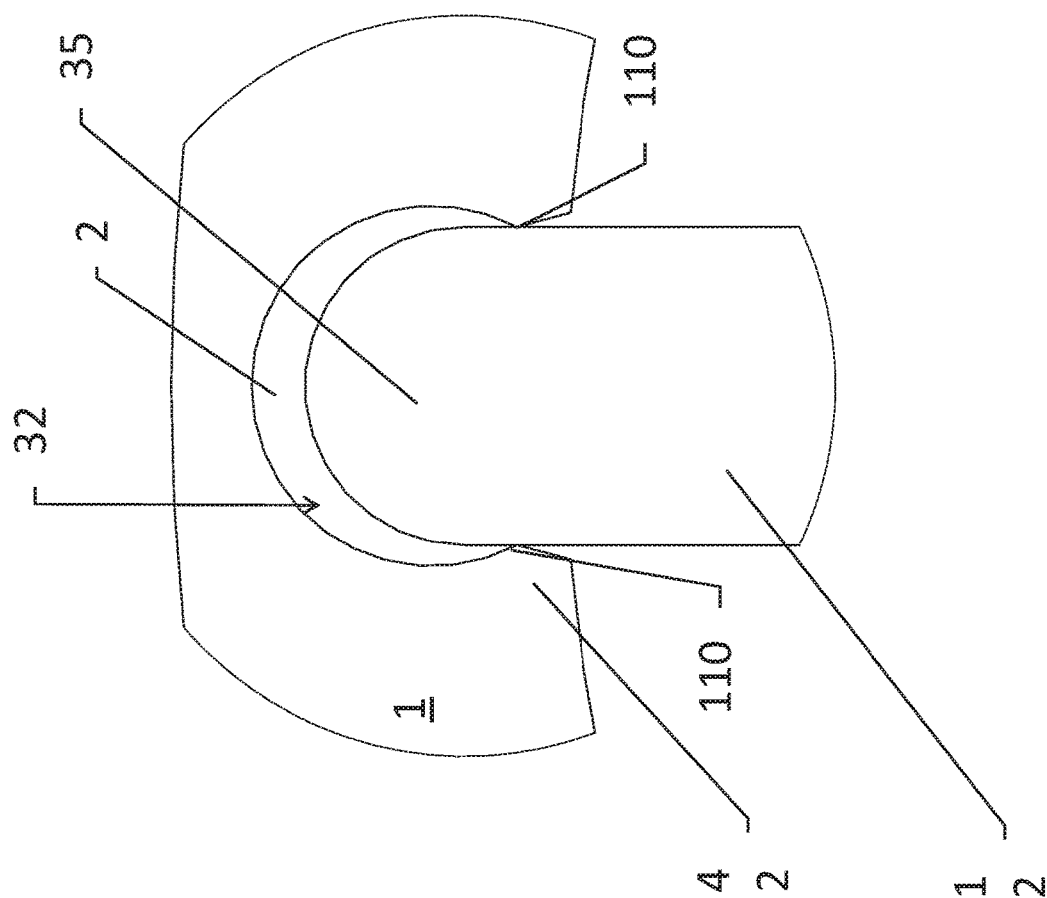
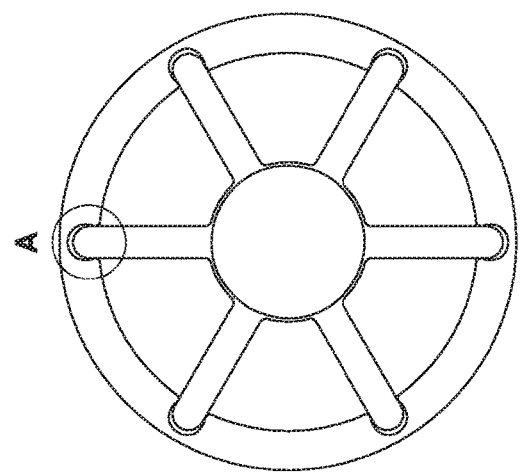
Figure 10

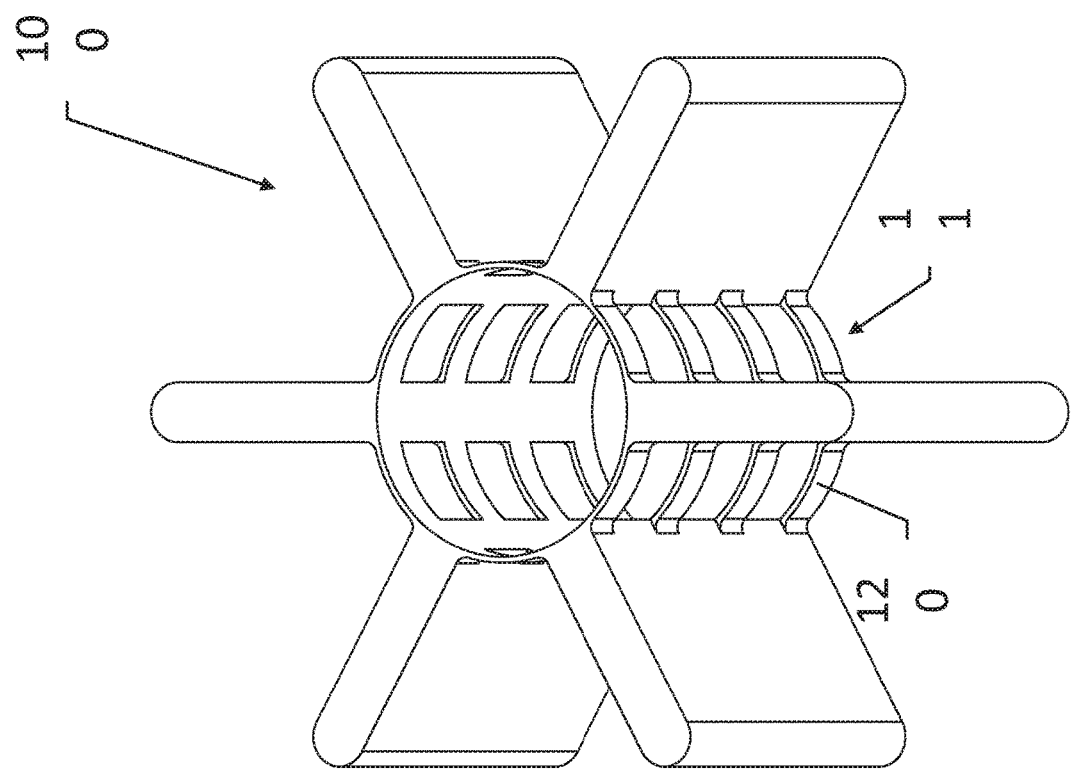
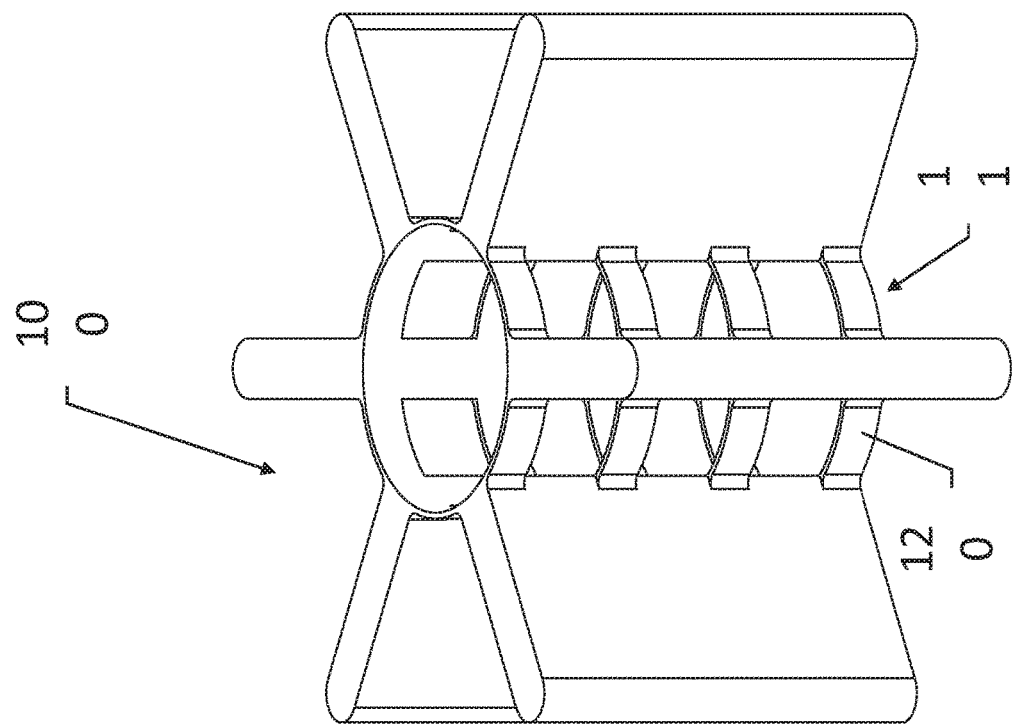
Figure 11

SPLIT STATOR BODY FOR AN ELECTRIC MACHINE

CROSS-REFERENCE TO RELATED APPLICATIONS

This application is a National Phase entry of International Application No. PCT/FR2018/050766, filed on Mar. 29, 2018, which claims priority to French Application Nos. 17/52821 filed on Mar. 31, 2017, and 17/57839 filed on Aug. 24, 2017, all of which are incorporated by reference herein.

TECHNICAL FIELD

The present invention relates to the field of brushless rotating electric machines, particularly at high speeds, typically more than 10,000 rpm, and more particularly relates to the reduction in noise and vibrations caused by such rotating electric machines.

BACKGROUND

The vibrations of electromagnetic machines cause noise pollution that is sometimes unacceptable for normal use, as well as a reduction in reliability. To reduce the sources of vibrations, action is usually taken on factors such as:
 electrical imbalances,
 mechanical imbalances: rotor, couplings or driven equipment,
 mechanical effects: play, friction, bearings,
 external effects: base, driven equipment, misalignment, resonances, critical speeds, critical contact.

The article "An Analytical Approach to Solving Motor Vibration Problems" IEEE Paper No. PCIC-99-20, by William R. Finley Mark M. Hodowanec Warren G. Holter, which presents the different sources of vibration is known in the state-of-the-art.

Also known is the US patent application US2013057105 relating to permanent magnet rotor motors and more specifically methods and systems for reducing noise and cogging torque in motors incorporating a permanent magnet rotor. The torque resulting from the magnetic interaction between the rotor and the stator may contain an undesirable torsional ripple, either resulting from the current in the windings or simply from the interaction of the permanent magnets and the stator, this ripple being present in a non-powered motor, which is known as the cogging torque. In addition, radial forces may exist between the rotor and the stator that cause annoying noise. In addition, the teeth and torque pulses at the motor shaft can be transmitted to some other driven equipment. The solution proposed in this prior art document relates to an open slot stator core comprising a plurality of slots and teeth, with a ferromagnetic material inside the rotor core configured to concentrate and direct the flow of one or more of said magnets to a stator tooth close to the ferromagnetic material.

The European patent EP2182218 discloses a centrifugal pump, the purpose of which is to ensure a stable construction without stator play so that no vibration, noise or resonance occurs is also known.

The solutions of the prior art do not make it possible to correctly deal with the vibration peaks occurring at certain speeds corresponding to the natural frequencies of the electric machine.

SUMMARY

The purpose of the invention is to reduce the creation and spatial propagation of noise emitted by the stator by allowing an articulation of the stator teeth relative to the yoke with one or two degree(s) of rotational or translational freedom. More particularly, the invention relates to a stator for an electric machine having a plurality of radially extending teeth supported by an outer annular yoke radial to said teeth, at least one part of the teeth being coiled, characterized in that at least one part of the teeth has at least one degree of rotational and/or translational freedom relative to said annular yoke.

In a first alternative solution, at least one part of the teeth has only one degree of rotational freedom relative to the annular yoke, the axis of rotation being parallel to the axis of rotation of the machine. In a second alternative solution, at least one part of the teeth has only one degree of translational freedom in an axial direction, relative to said annular yoke. In a third alternative solution, at least one part of the teeth has only one degree of translational freedom in a radial direction, relative to the annular yoke. In a fourth alternative solution, at least one part of the teeth has a first degree of rotational freedom, and a second degree of translational freedom relative to said annular yoke.

Preferably, the stator has at least one inner tubular crown radial to said teeth made of a saturated non-magnetic or magnetic material connecting said teeth. Alternatively, this inner tubular crown is discontinuous along the height of said yoke, forming several saturable isthmuses. Preferably, the inner tubular crown has an axisymmetric revolution geometry, but it is possible to produce an inner tubular crown having an aperiodic revolution geometry.

Advantageously, the outer annular yoke has flutes of cylindrical shape opening towards said teeth, said teeth having at their ends, on the side of said outer annular yoke, a protuberance of partially cylindrical shape complementary to the cylindrical shape of said flutes. Preferably, said cylindrical shape of said flutes is a semi-circular cross-sectional shape, the radius of curvature of which is greater than the radius of curvature of the shape of said cylindrical protuberance of the teeth. Preferably, the complementary shapes lead to two opening areas where the flutes form, with the teeth flanks, an air gap with an angle of less than 10°. The stator can have several teeth, typically six teeth are illustrated in this application.

In one embodiment, said protuberance is one-piece in shape, integral with said tooth. Alternatively, said protuberance is completed by at least one sleeve radially positioned between the tooth and the outer annular yoke. In one embodiment, an additional film made of a material with mechanical damping properties is inserted between the sleeve and the yoke.

The teeth and the yoke are adjusted directly or using a connecting piece, by a sliding contact area extending in an axial direction, in a tangential plane perpendicular to the median radius of the tooth. This contact area constitutes a sliding line or sliding surface or a succession of sliding points preserving the degree of rotational freedom and/or the degree of translational freedom.

BRIEF DESCRIPTION OF THE DRAWINGS

The present invention will be best understood upon reading the following detailed description of a non-restrictive exemplary embodiment, while referring to the appended drawings, wherein:

FIGS. 2a, 2b and 2c represent pairs of stator views according to alternative solutions of a first embodiment with angular openings of the flutes, with for each of these figures: on the left a stator face view without coil and on the right an enlarged view of the junction between a tooth and the stator crown;

FIG. 4 represents a view of an alternative embodiment where the tubular connecting crown has a non-periodic shape;

FIG. 8 represents two stator views according to one embodiment allowing a degree of translational freedom of the stator teeth;

FIG. 9 represents two views showing the degrees of freedom allowed by the invention, respectively to the left for the degree of translational freedom and to the right for the degree of translational freedom;

FIG. 10 represents two views of a stator according to the invention and a particular mode allowing two degrees of—rotational and translational—freedom to be combined for the toothed assembly;

FIG. 11 represents two views from different perspectives of a particular embodiment of a toothed assembly according to the invention;

DETAILED DESCRIPTION

Figure 1A:
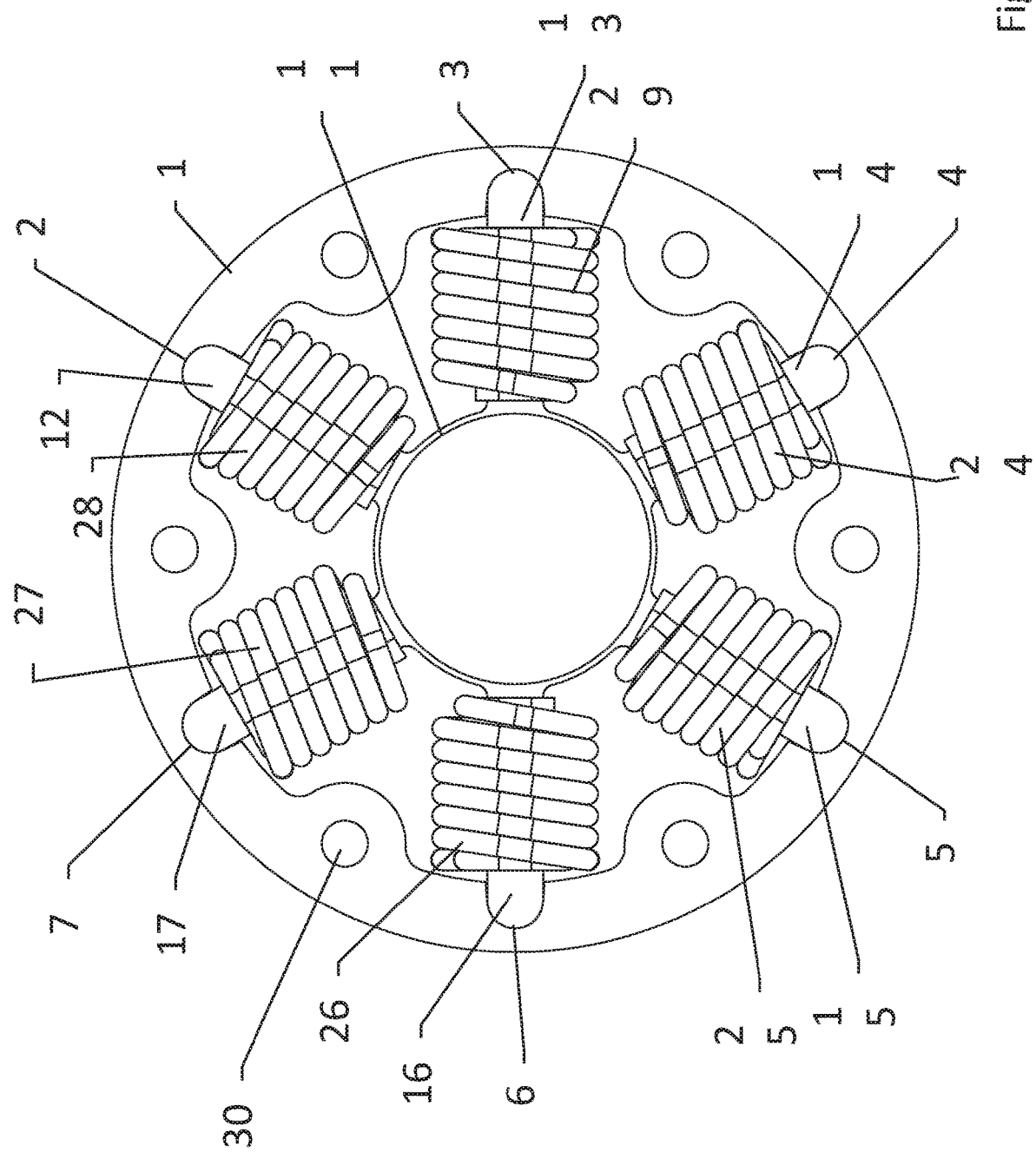
FIGS. 1a and 1b represent a front view of stators according to the invention, respectively with and without a power supply coil.
Figure 1B:
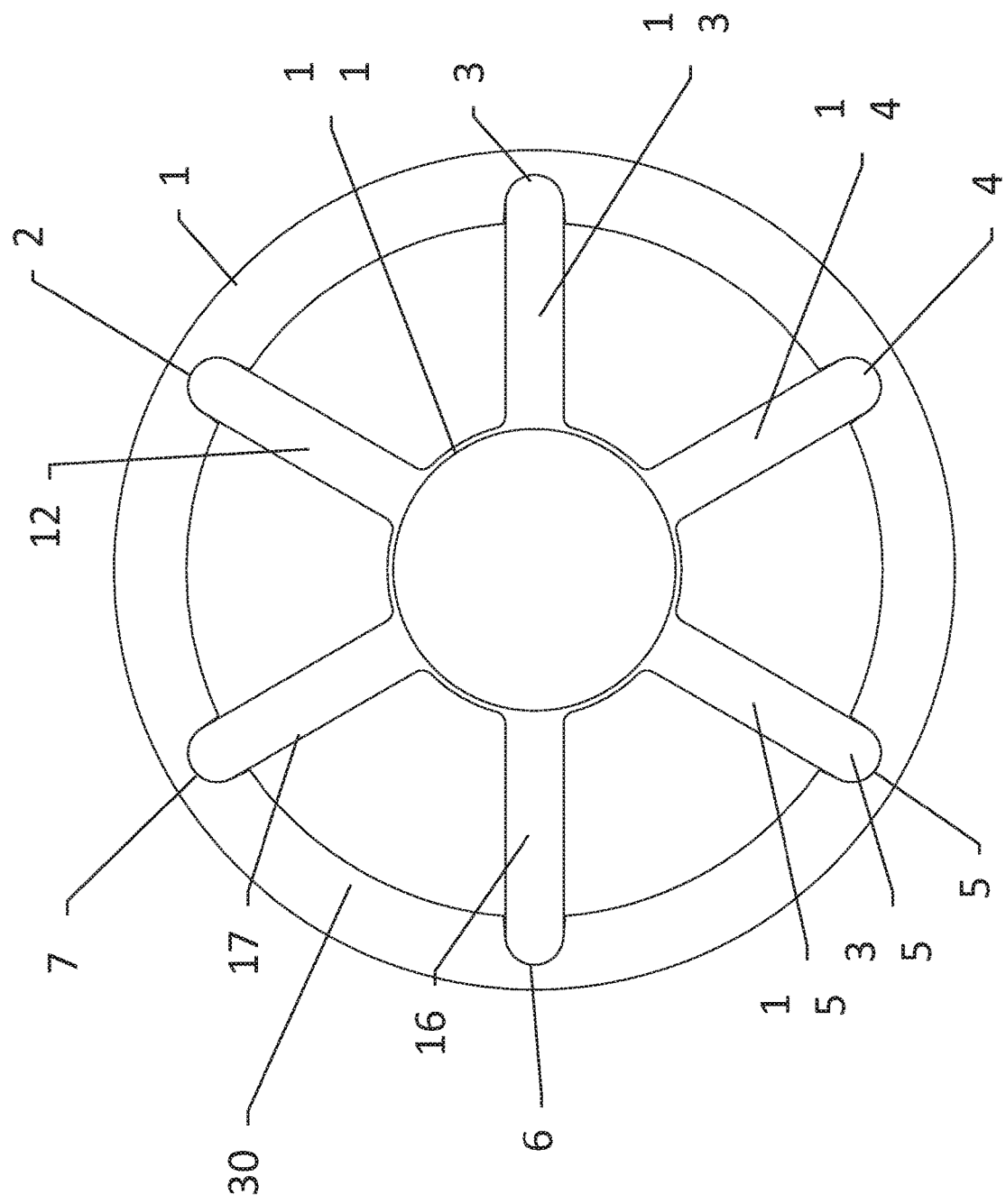

FIG. 1a shows a front view of an exemplary embodiment of a coiled stator according to the invention in a preferred mode. FIG. 1b is a view without a coil and with a different yoke.

The stator comprises a yoke 1 having a tubular shape made of a ferromagnetic material with flutes 2 to 7 extending parallel to the median axis on the inner wall of the yoke 1. The holes 30 are not significant in the invention and are only used to realistically represent, in this figure, the means through which this stator can be attached in the application. The cross-section of these flutes 2 to 7 is semi-circular, to enable the pivoting embedding of the ends of the teeth 12 to 17. The radially extending teeth 12 to 17 are surrounded by electric coils 24 to 29, usually made of wound copper wires or aluminum blades.

These teeth 12 to 17 are made up of solid parts or stacks of sheet metal made of ferromagnetic material, having a rectangular section extended at the rear by a rounded protuberance 35, with a rounded section complementary to the section of the flutes 2 to 7, to enable the pivoting of an amplitude of a few tenths of degrees to a few degrees, for example ±1°, relative to a radial median orientation. The opposite, i.e. inner, end of the teeth 12 to 17 is connected to a tubular connecting crown 11 made of non-magnetic or magnetically saturated material. This crown 11 is used to help stiffen the mechanical structure of the stator but it is only an alternative solution, although it is preferred for a reason of mechanical holding together of the teeth, not limiting the embodiment of the invention.

This tubular connecting crown 11 can have an asymmetrical configuration, for example with a wall of non-constant thickness or a variable stiffness to avoid resonance between the teeth 2 to 7. This is illustrated in FIG. 4.

Figure 2C:
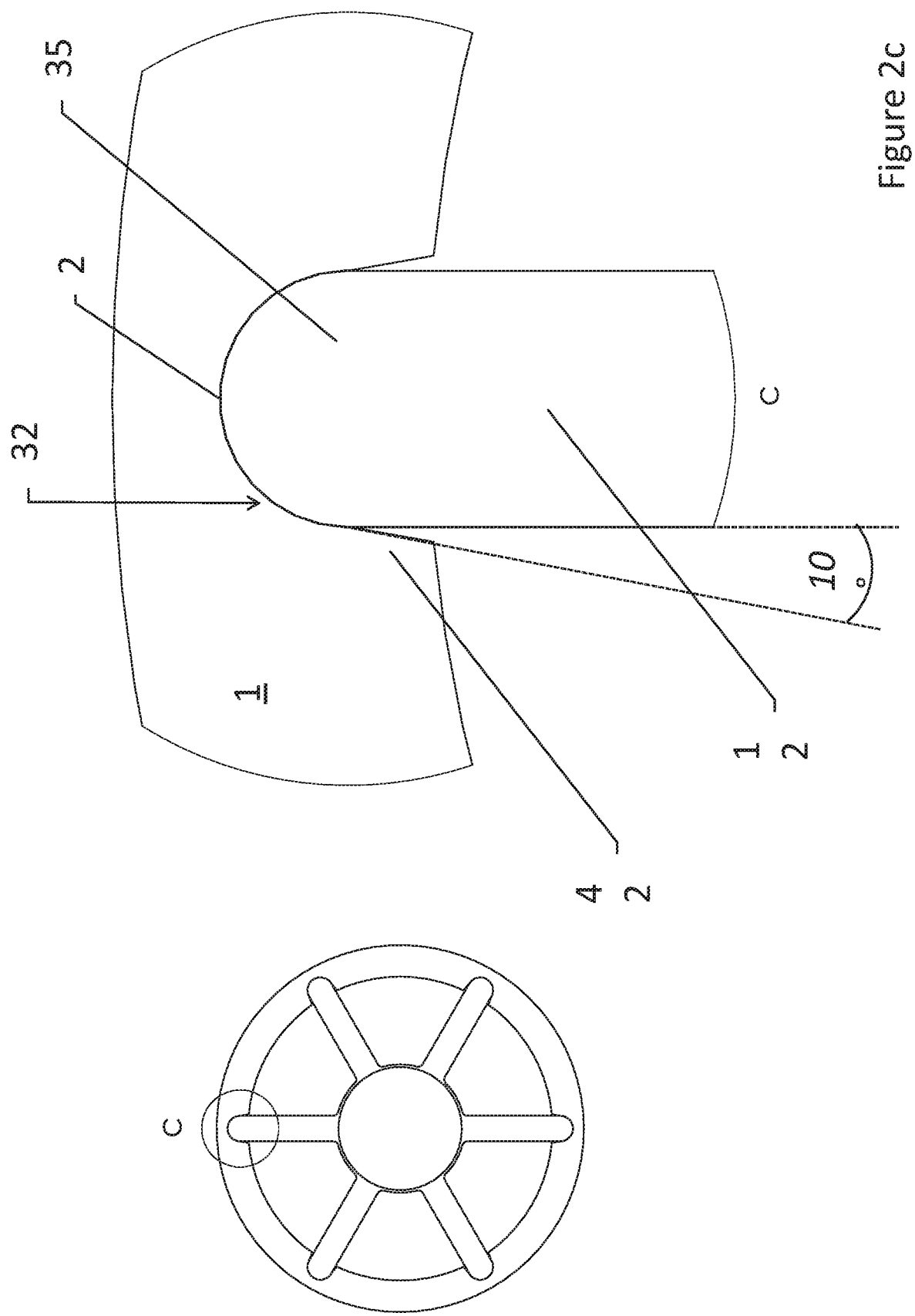

FIGS. 2a to 2c show detailed views of the pivoting connection between the tooth 12 and the tubular yoke 1 in different cases of flutes opening. The three examples given in FIGS. 2a, 2b and 2c represent openings of 1°, 5° and 10° respectively, the opening being defined below. The rear protuberance 35 of the tooth 12 has a semi-cylindrical shape with a constant radius of curvature extending over approximately 180°. It is engaged in the flute which has a bottom 32 with a constant radius of curvature complementary to the radius of curvature of the tooth 12, over approximately 180°. This semi-cylindrical part opens onto a section 42 forming an opening angle with the radial plane, according to the three exemplary cases shown, to enable the tooth 12 to pivot, according to the load cases and the observed vibration levels.

The tooth 12 thus has a degree of rotational freedom. With reference to the reference mark (R, 0, Z) drawn in FIG. 2a and centred on the centre of the cylindrical protuberance 35, the tooth 12 is free to slide about the Z axis at the bottom of the flute 2.

The clearance between the rear protuberance 35 of the tooth 12 and the bottom of the flute 2 is typically 0.01 mm, although this value is not restrictive. A film of lubricant can be provided, although not mandatory, between the rear protuberance 35 of the tooth 12 and the bottom of the flute 2. Similarly, a film made of a viscous material with mechanical damping properties can be inserted.

Figure 6:
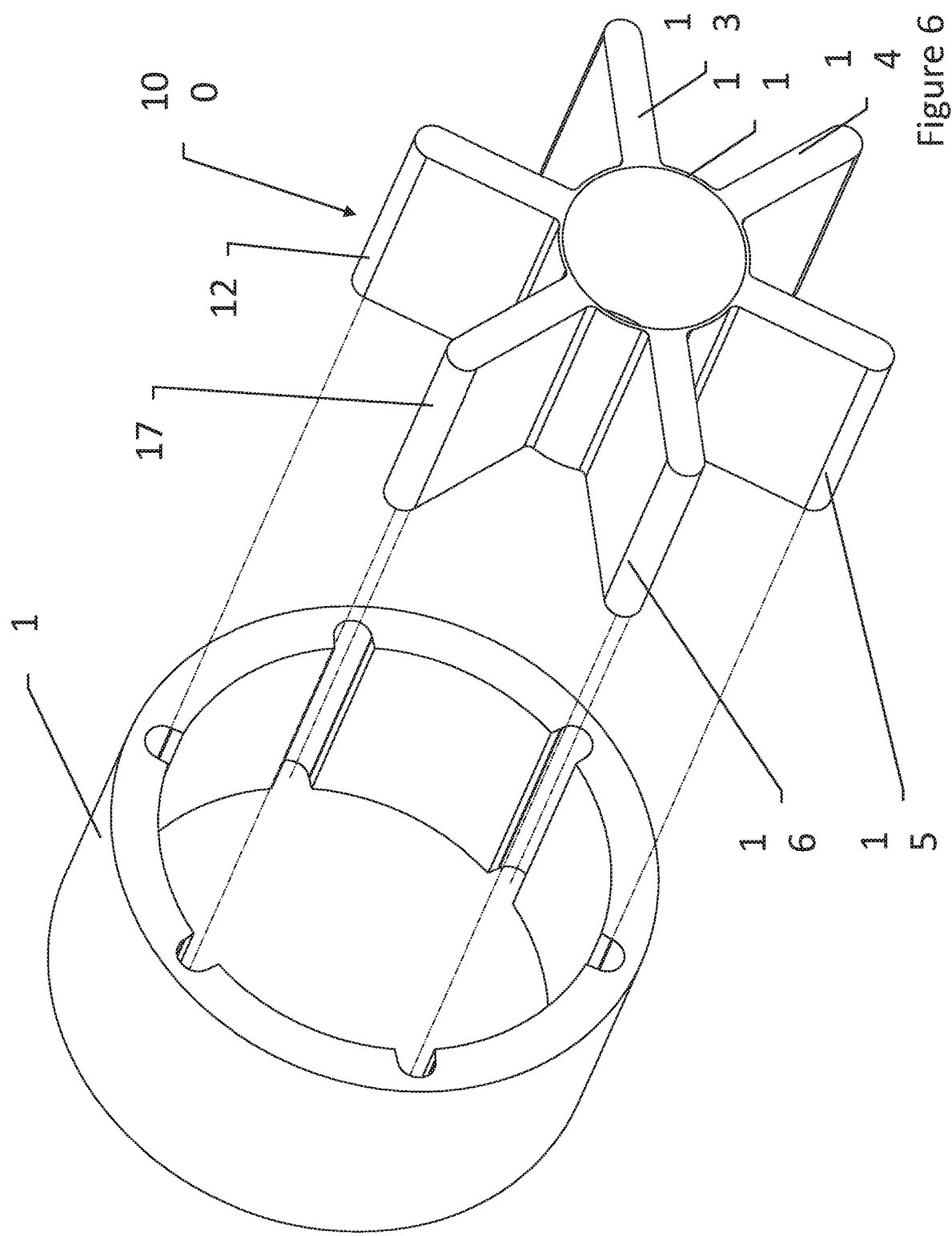
FIG. 6 represents a perspective view of a stator according to the invention and according to an exploded view.

FIG. 6 shows the two stator assemblies formed on the one hand by the radial annular yoke 1, itself formed by an assembly of ferromagnetic sheets or by a solid material, and on the other hand by a toothed assembly 100 formed by the teeth 2 to 7 connected to the tubular connecting crown 11. This toothed set 100 is also formed either by an assembly of ferromagnetic sheets or by a solid material.

Alternative Embodiments

Figure 3A:
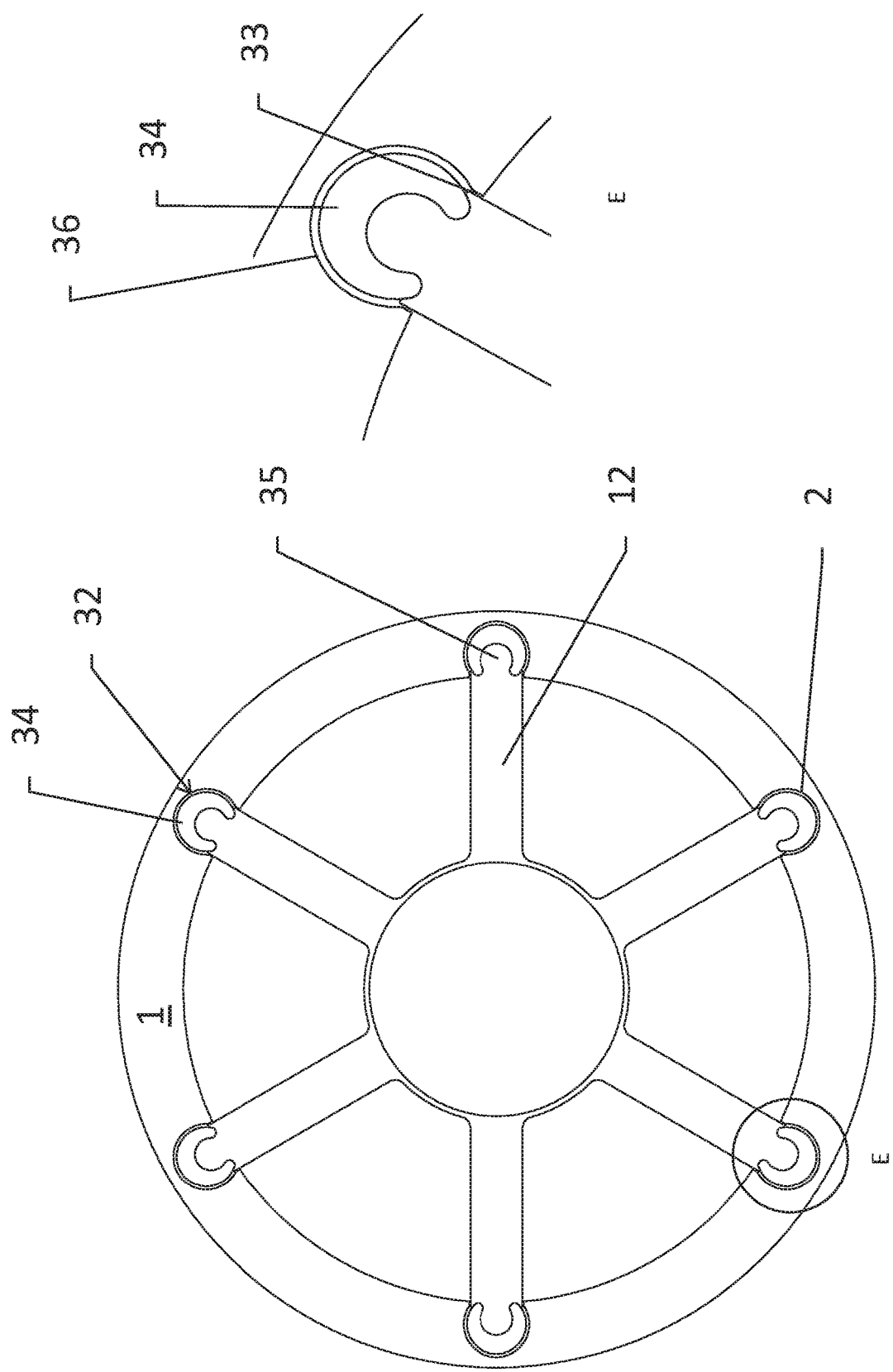
FIGS. 3a, 3b and 3c respectively represent front views and two perspectives of a second embodiment using a material with mechanical damping properties between the teeth and the yoke.
Figure 3B:
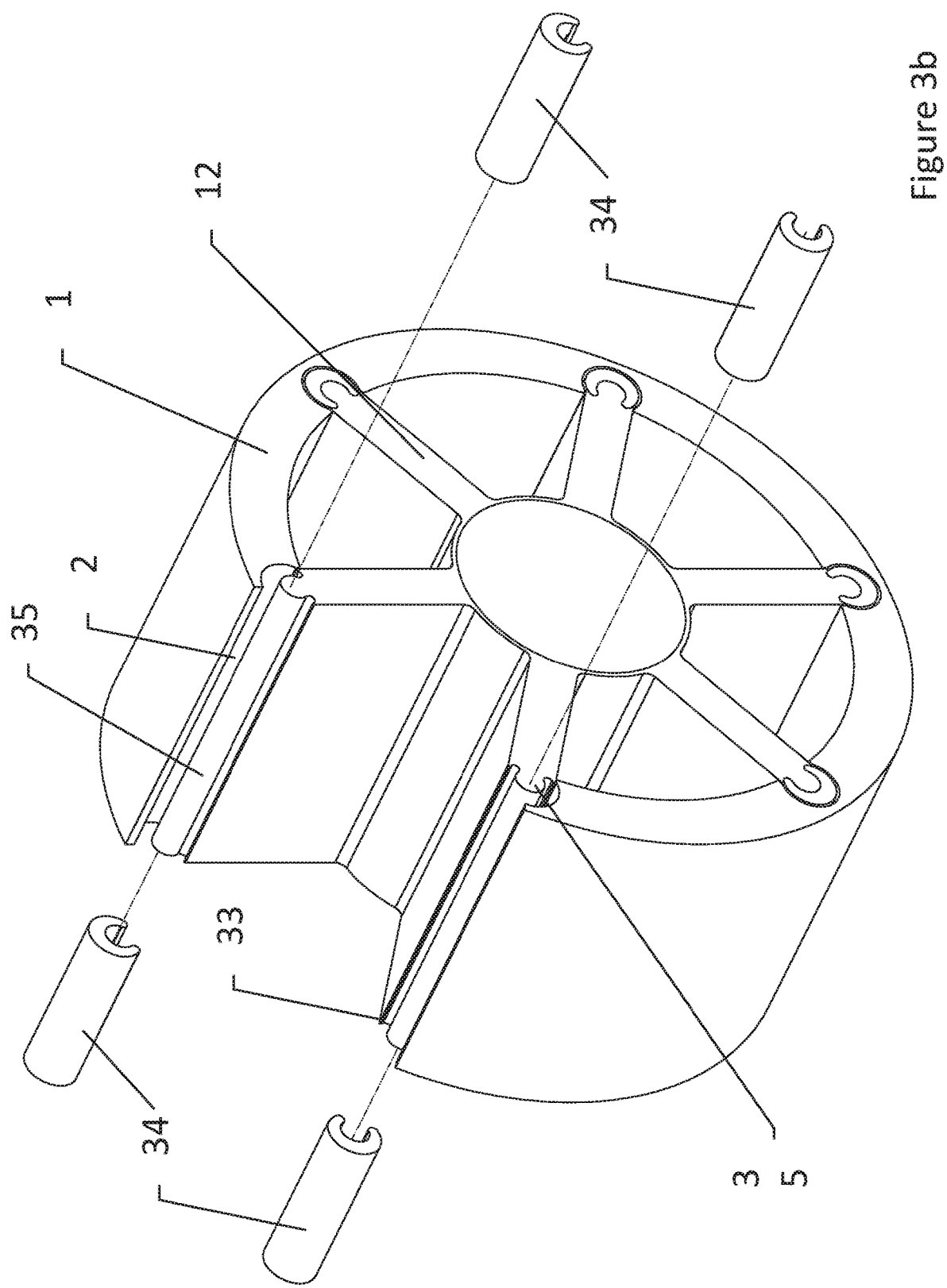
Figure 3C:
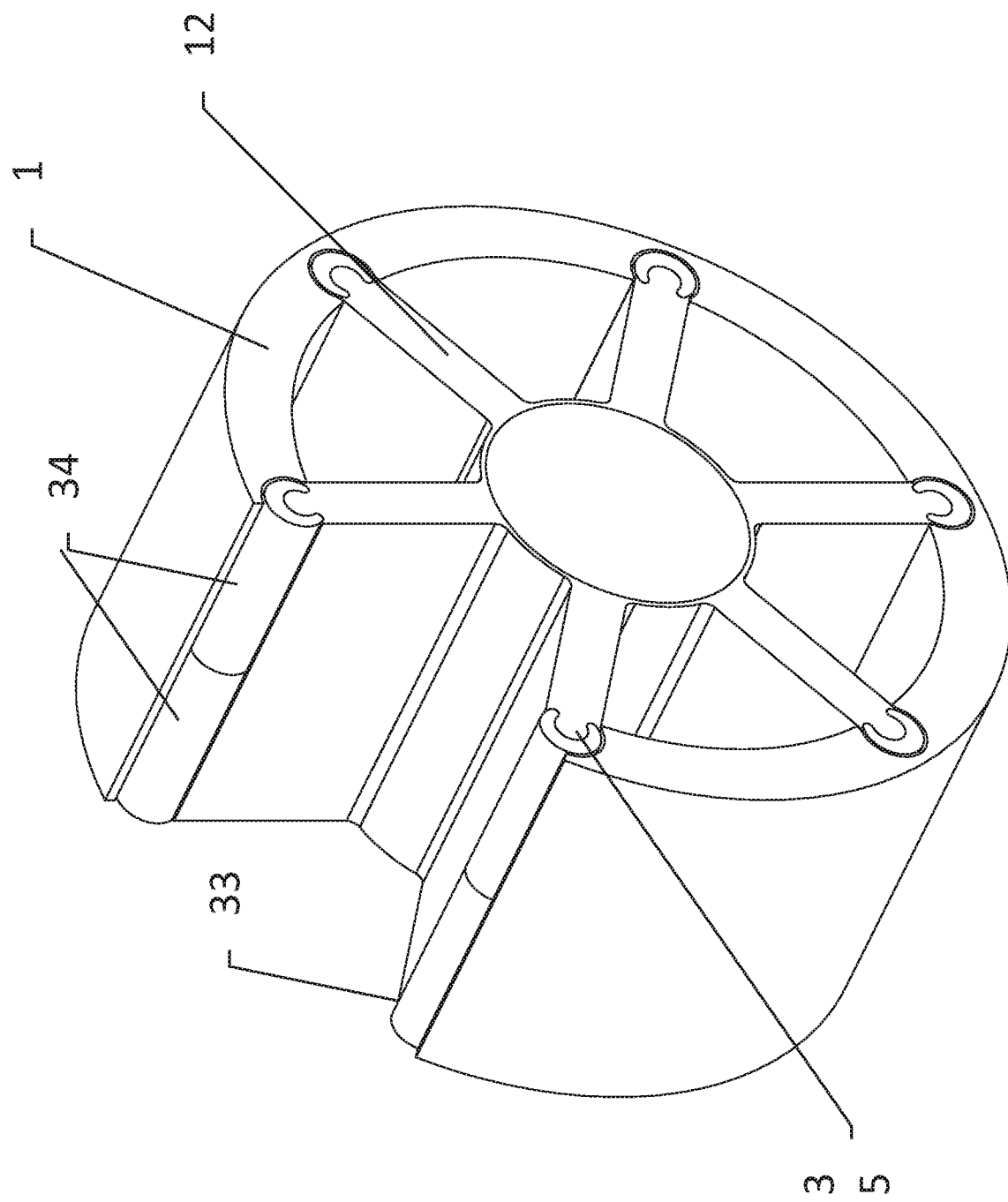

FIGS. 3a, 3b and 3c illustrate an alternative solution, where the tooth 12 is engaged in the flute 2 with an additional sleeve 34. The flute 2 closes at an angle of approximately 230°, without this value being restrictive, and ends on either side of the radial median plane with an edge 33 resting against the lateral flank of the tooth 12. A different form of contact can be considered between the tooth 12 and the yoke 1 depending on the desired mechanical strength.

The semi-tubular protuberance or extension 35 of the tooth 12 includes a sleeve 34. A viscous material with mechanical damping characteristics is inserted into the space (36) between the sleeves (34) and the tooth bottom (32). It may be considered to charge the film with ferromagnetic particles, or even to make this film from a flexible ferromagnetic material, in order to minimize losses in magnetic performance by minimizing residual air gaps.

FIG. 3b shows an exemplary construction of a stator using this embodiment where the sleeves 34 are two in number per tooth and are slid on either side of the semi-tubular protuberances 35 during mounting. The damping film can thus be inserted after positioning a sleeve, the second sleeve 34 being used to distribute the damping film by a piston effect. After mounting the sleeves 34, in FIG. 3c, the damping film is in place.

Figure 5:
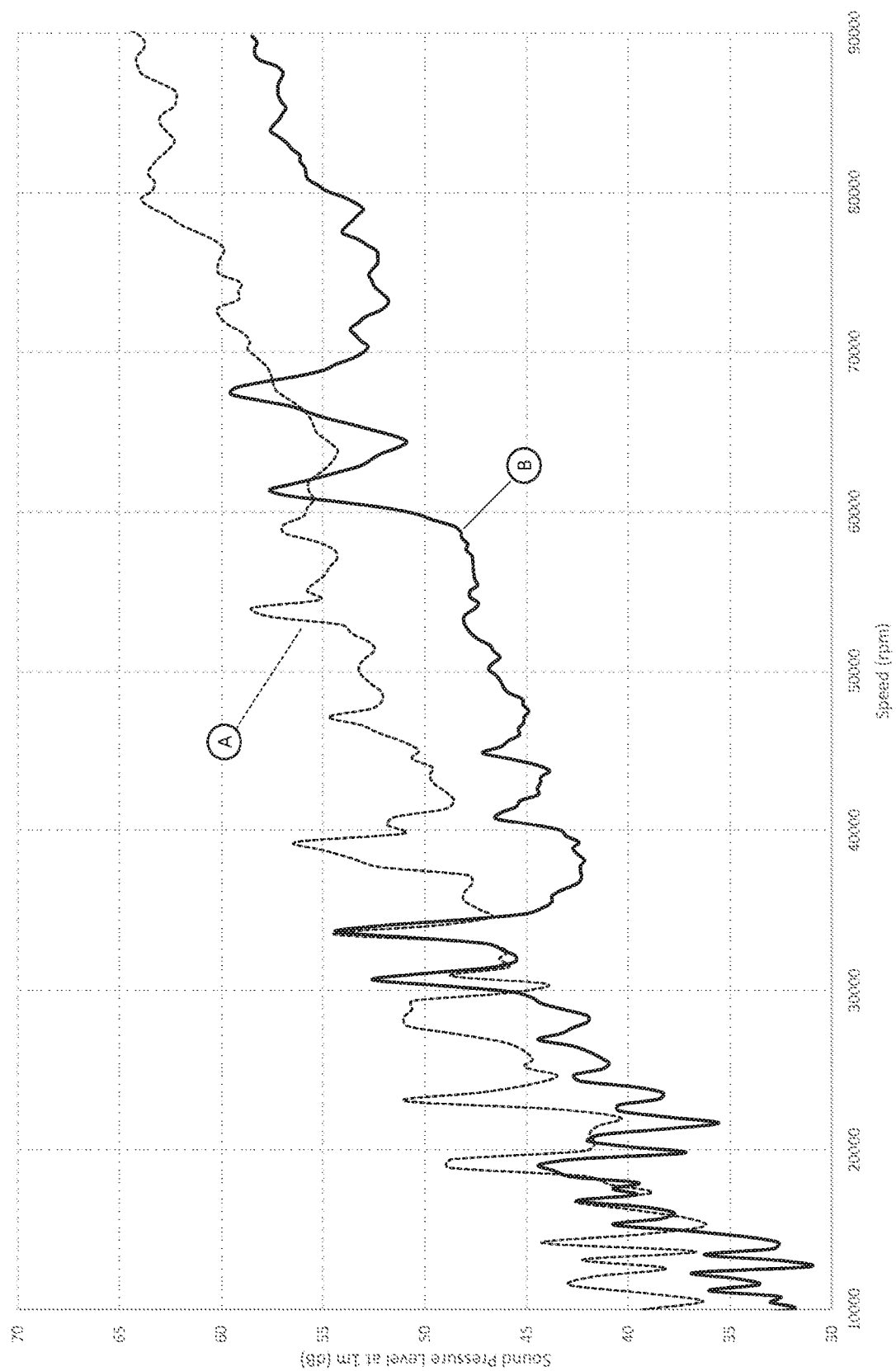
FIG. 5 represents a graph of the improvement in the noise emission performance of a machine using the principles set out in this invention.

FIG. 5 typically shows the improvements obtained in terms of noise emission, in decibels, of an electric machine according to the invention, noted B, following a linearly increased rotational speed, and compared to a similar machine (identical size, thickness and mechanical properties) not taking advantage of the characteristics of the invention, noted A. If, occasionally, for a few isolated speeds, a few peaks show a deterioration in noise emissions, the average level is greatly reduced over the entire diagram produced. At speeds above 80,000 rpm (RPM), the improvement is greater than 5 dB.

Figure 7:
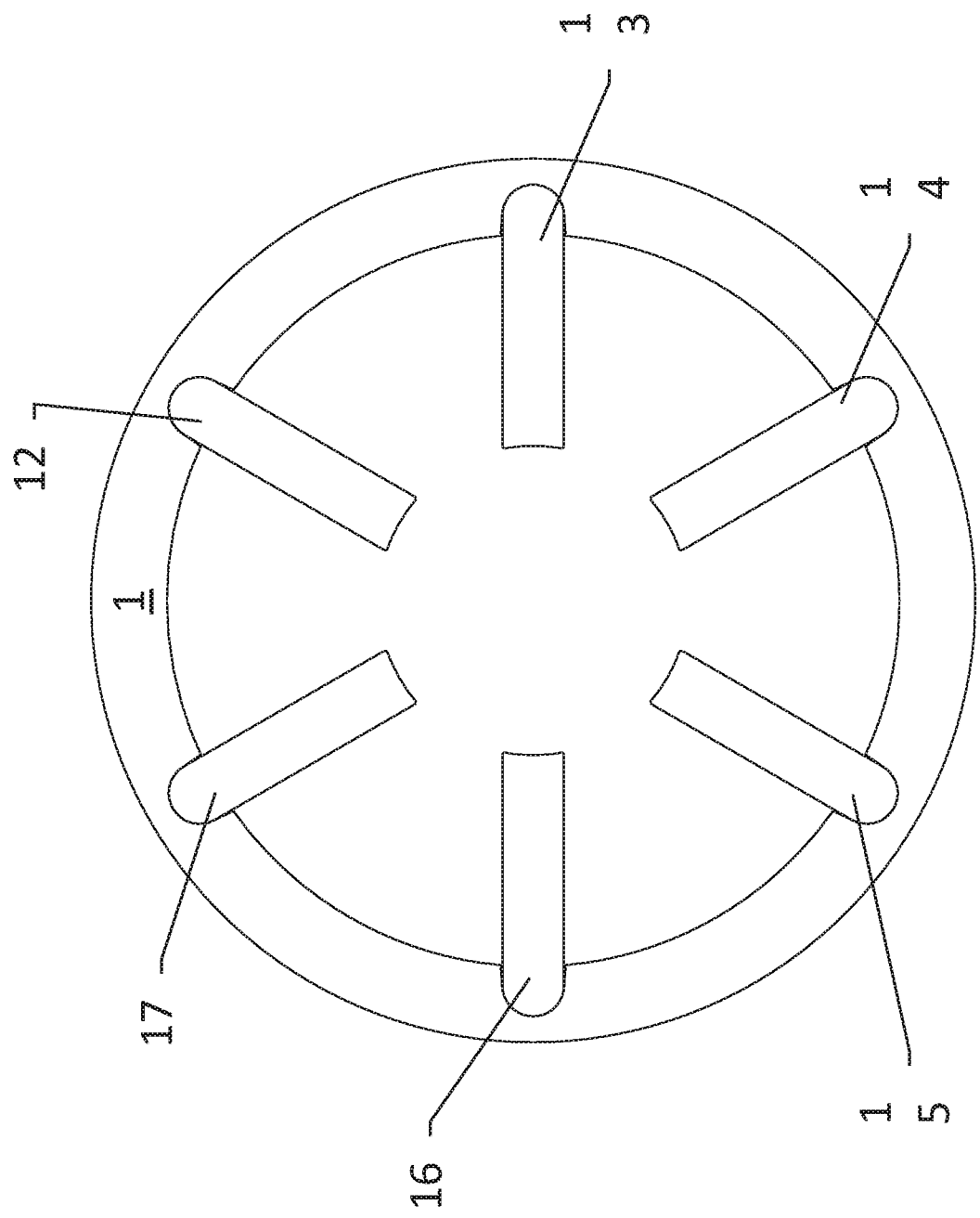
FIG. 7 represents a front view of a stator according to the invention, according to an alternative embodiment.

FIG. 7 shows an alternative version that does not have a tubular connecting crown 11. Although more difficult to achieve, due to the unitary objects formed by each of the teeth 12 to 17, this version is envisaged and can be proposed according to the application, the main object of the invention being the possibility of pivoting the stator teeth.

FIG. 8 shows one embodiment that allows a degree of translational freedom of the tooth 12 in the flute 2, which is radially set back from the position of the tooth 12. In this way, the protuberance 35 of the tooth 12 radially slides inside the flute 2. In particular, with reference to the reference mark (R, 0, Z) drawn in FIG. 8 and centred on the centre of the cylindrical protuberance 35, the tooth 12 is free to slide along the R axis towards the bottom of the flute 2.

According to the invention, it is possible to have a degree of translational freedom, as shown in the left view of FIG. 9, or a degree of freedom, as shown in the right view of FIG. 9, or to combine these degrees of freedom as shown in FIG. 10. In the latter case, the outer annular yoke 1 has a tooth bottom 32 radially set back from the tooth protuberance 35 to enable the translation of the tooth 12, and an opening section 42 forming an opening angle with the radial plane to enable the pivoting of the tooth 12. In this case, the tooth 12 can be pivoted and translated using the supports 110 of the annular yoke 1 at the junction between the opening section 42 and the tooth bottom 32. In particular, with reference to the reference mark (R, 0, Z) drawn in FIG. 10 and centred on the centre of the cylindrical protuberance 35, the tooth 12 is free to slide about the Z axis on the supports 110 and to translate along the R axis towards the bottom of the flute 2.

FIG. 11 shows an alternative solution of the toothed assembly 100 where the inner tubular crown 11 is not continuous, forming magnetically saturable isthmuses 120 along the height of the toothed assembly 100. This is possible, for example, by alternating sheets having different profiles when this toothed assembly 100 is made with a package of sheets. The advantage of this embodiment is possibly to enable a reduction in the magnetic short circuit between each tooth of this toothed assembly. The number of isthmuses 120 is not fixed.

Figure 12:
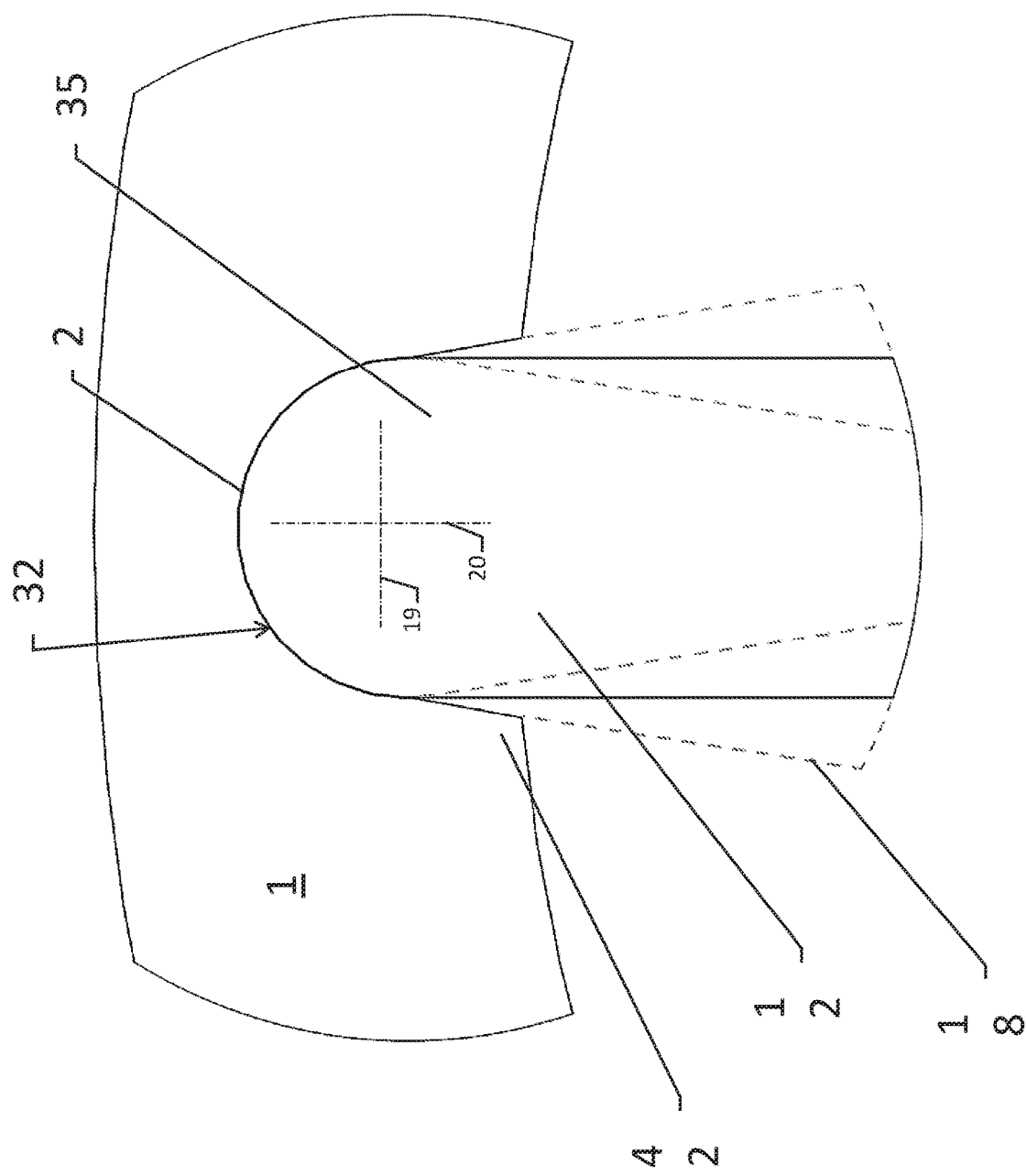
FIG. 12 represents a cutting view showing the rotational amplitude of the tooth.

FIG. 12 shows the rotational amplitude 18 of the tooth 12, on either side of the median position, by means of the dotted lines, relative to the centre defined by the two reference axes 19, 20. In this case, the rear projection 35 of the tooth 12 and the bottom 32 of the flute have a similar radius which constitutes a sliding surface, at an angle of about 180°. The center of these radii is visualized by the intersection of the axes 19, 20.

Figure 13A:
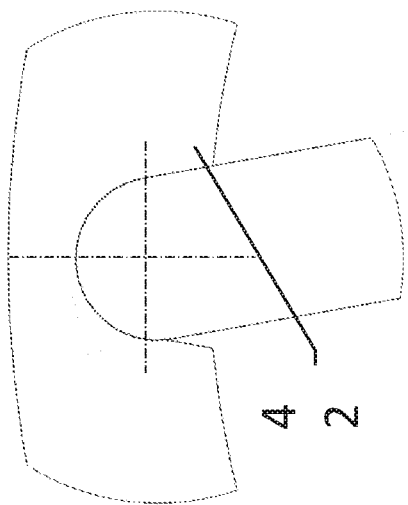
FIGS. 13a, 13b, and 13c represent the different moments of a tooth rotation.
Figure 13B:
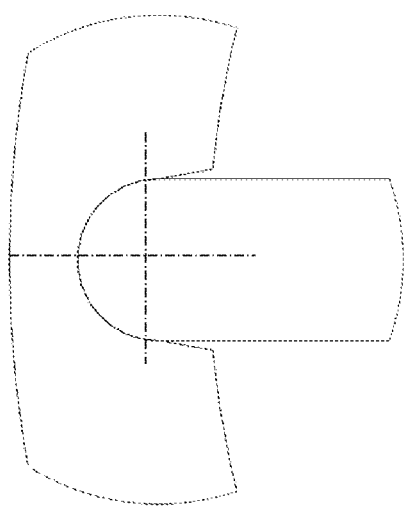
Figure 13C:
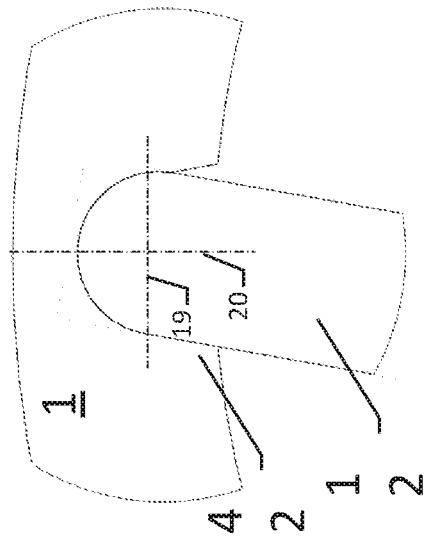

This tooth rotation is temporally detailed through FIGS. 13a, 13b and 13c. FIG. 13a shows the tooth 12 that has been rotated clockwise and which, here not restrictively, comes near the open section 42. FIG. 13b shows the tooth 12 that has been rotated counterclockwise and which, here not restrictively, comes near the open section 42. FIG. 13b shows the tooth in a median position where the tooth is not excited or moving from one position to another.

Figure 14:
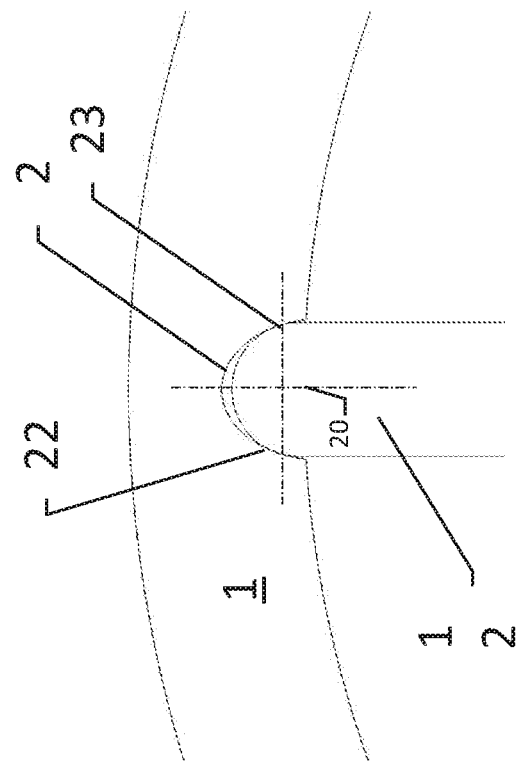
FIG. 14 represents a sectional view according to an alternative embodiment.
Figure 15:
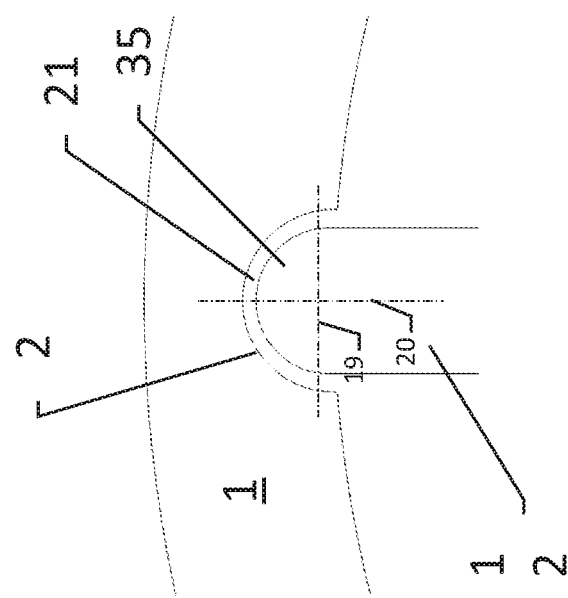
FIG. 15 represents a sectional view according to another alternative embodiment.

FIG. 14 shows an alternative embodiment where the rear protuberance 35 of the tooth 12 has a radius similar to that of the flute 2 but the tooth is not in contact with the flute, generating an air gap 21 between the tooth 12 and the yoke 1. In this embodiment, the mechanical contact between the yoke 1 and the teeth 12 is achieved using the tubular crown 11 and the contact connection of one tooth or more other teeth with the yoke 1. FIG. 15 shows an alternative embodiment where the rear protuberance 35 of the tooth 12 has a non-constant radius in order to have two minimal sliding surfaces on either side of the median axis 20 of the tooth 12. This embodiment minimizes the sliding surfaces and therefore minimizes friction and mechanical losses.

The invention claimed is:

1. A stator for an electric machine comprising:
    a plurality of radially extending teeth supported by an outer annular yoke radial to the teeth, at least part of the teeth supporting a coil;
    the outer annular yoke including flutes of partially cylindrical shape opening towards teeth;
    at least part of the teeth each having at their ends, on the side of the outer annular yoke, a protuberance of partially cylindrical shape; and
    the protuberance being held in the flute by contact points so that at least one part of the teeth performs a relative movement having a degree of rotational and/or translational freedom relative to the annular yoke.

2. The stator for an electric machine according to claim 1, wherein at least one part of the teeth performs a relative movement having only one degree of rotational freedom relative to the annular yoke, an axis of rotation being parallel to an axis of rotation of the machine.

3. The stator for an electric machine according to claim 1, wherein at least one part of the teeth performs a relative movement having only one degree of translational freedom in a radial or axial direction, relative to the annular yoke.

4. The stator for an electric machine according to claim 1, wherein at least one part of the teeth performs a relative movement having a first degree of rotational freedom and a second degree of translational freedom relative to the annular yoke.

5. The stator for an electric machine according to claim 1, wherein the contact points form at least two lines.

6. The stator for an electric machine according to claim 1, wherein the contact points form at least one contact surface.

7. The stator for an electric machine according to claim 1, further comprising at least one inner tubular crown radial to the teeth of a saturated non-magnetic or magnetic material connecting the teeth.

8. The stator for an electric machine according to claim 7, wherein the inner tubular crown is discontinuous along the height of said yoke, forming several saturable isthmuses.

9. The stator for an electric machine according to claim 7, wherein the inner tubular crown has a non-periodic revolution geometry.

10. The stator for an electric machine according to claim 1, wherein the shapes of the complementary protuberances lead to two opening sections where the flutes form, with the teeth flanks, an air gap with an angle of less than 10°.

11. The stator for an electric machine according to claim 1, wherein there are six of the teeth.

12. The stator for an electric machine according to claim 1, wherein the protuberance is one-piece in shape, integral with tooth.

13. The stator for an electric machine according to claim 1, wherein the protuberance is completed by at least one sleeve radially positioned between the tooth and the outer annular yoke.

14. The stator for an electric machine according claim 13, further comprising an additional film made of a material with mechanical damping properties is inserted between the sleeve and the yoke.

15. The stator for an electric machine according to claim 3, wherein the flutes are radially set back relative to the position of the teeth and the teeth radially slide inside the flutes.

16. The stator for an electric machine according to claim 2, wherein the outer annular yoke has a tooth base radially set back relative to the tooth protuberance to enable the translation of the tooth and an opening section forming an opening angle with the radial plane, to enable the tooth to pivot using supports of the annular yoke, at the junction between the opening section and the tooth base.

17. A stator for an electric machine comprising:
an annular yoke including spaced apart and partially cylindrical shaped flutes on an internal surface thereof;
radially extending teeth, inwardly extending from the yoke, including outer ends pivotably received within the flutes;
an electric coil located around each of the teeth;
the teeth having rotational and/or translational freedom relative to the annular yoke; and
at least one inner tubular crown coupled to inner ends of the teeth, the crown being a saturated non-magnetic or magnetic material.

18. The stator for an electric machine according to claim 17, wherein:
the outer ends of the teeth have a partially cylindrical shape;
each of the teeth and the yoke have an air gap therebetween within the flute;
each of the teeth has 1-10 degrees of the rotational and/or translational freedom relative to the yoke;
the crown including a wall which is: (a) noncontinous or (b) asymmetrical of non-constant thickness; and
the electric machine rotates at more than 10,000 rpm with a noise reduction improvement as compared to without the movement of the teeth to the yoke.

19. A stator for an electric machine comprising:
an annular yoke including spaced apart and partially cylindrical shaped flutes on an internal surface thereof;
radially extending teeth, inwardly extending from the yoke, including outer ends pivotably received within the flutes;
an electric coil located around each of the teeth;
the teeth having rotational and/or translational freedom relative to the annular yoke; and
at least one sleeve radially positioned between the teeth and the yoke.

20. The stator for an electric machine according to claim 19, wherein:
the outer ends of the teeth have a partially cylindrical shape;
each of the teeth and the yoke have an air gap therebetween within the flute;
each of the teeth has 1-10 degrees of the rotational and/or translational freedom relative to the yoke; and
the electric machine rotates at more than 80,000 rpm with a noise reduction improvement of at least 5 dB as compared to without the movement of the teeth to the yoke.

* * * * *